May 12, 1970 R. K. McKIBBEN ET AL 3,511,373
DIVERSE SCREENS WITH CLEANING AND DISTRIBUTION MEANS
Filed May 22, 1967 6 Sheets-Sheet 1

RICHARD K. MCKIBBEN
THEODORE R. WESTFALL
CARLTON E. PRESNELL
INVENTORS.

BY
ATTORNEY

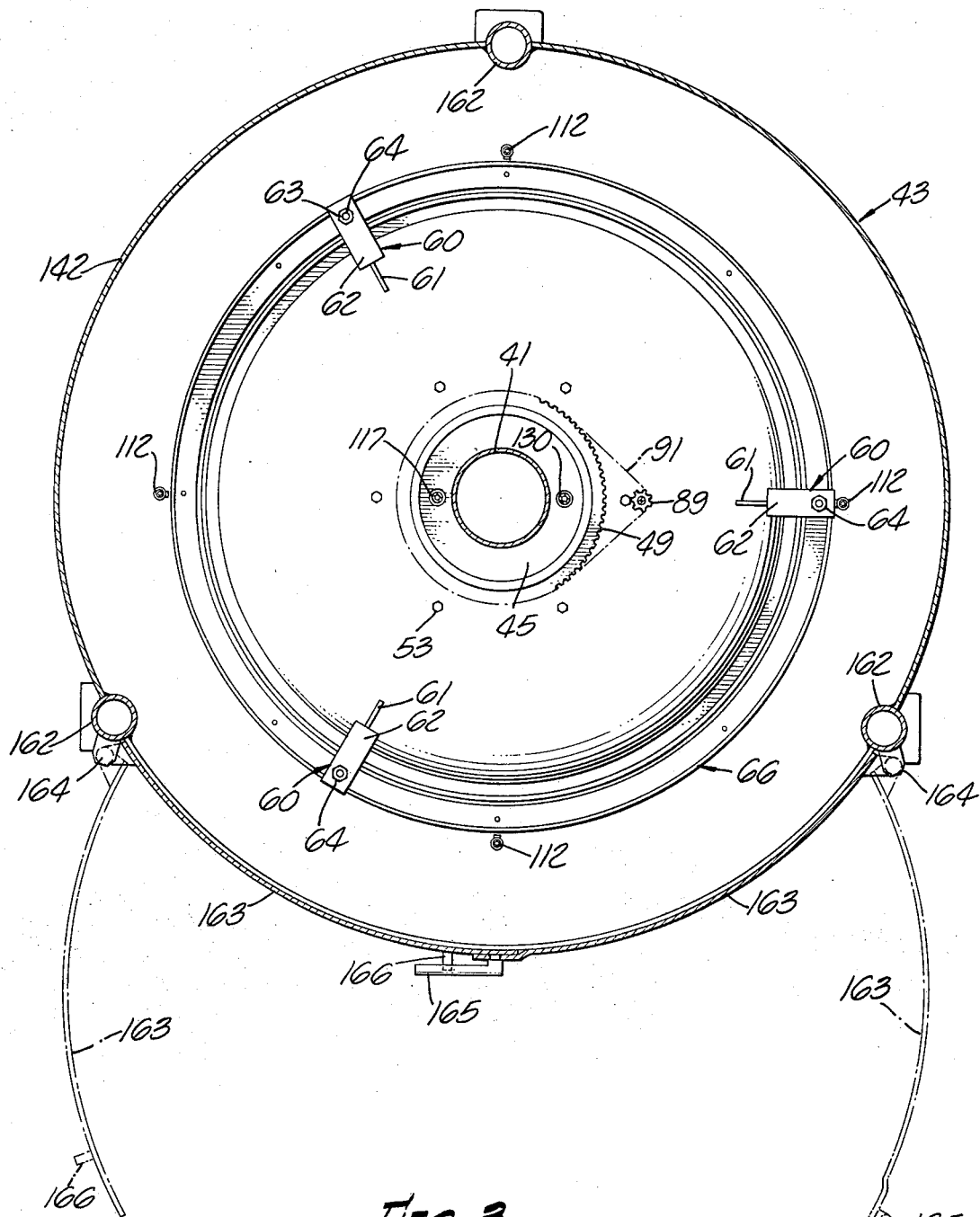

RICHARD K. MCKIBBEN
THEODORE R. WESTFALL
CARLTON E. PRESNELL
INVENTORS.

BY
ATTORNEY

May 12, 1970   R. K. McKIBBEN ET AL   3,511,373
DIVERSE SCREENS WITH CLEANING AND DISTRIBUTION MEANS
Filed May 22, 1967   6 Sheets-Sheet 4

RICHARD K. McKIBBEN
THEODORE R. WESTFALL
CARLTON E. PRESNELL
INVENTORS.

BY
ATTORNEY

May 12, 1970 R. K. McKIBBEN ET AL 3,511,373
DIVERSE SCREENS WITH CLEANING AND DISTRIBUTION MEANS
Filed May 22, 1967 6 Sheets-Sheet 6
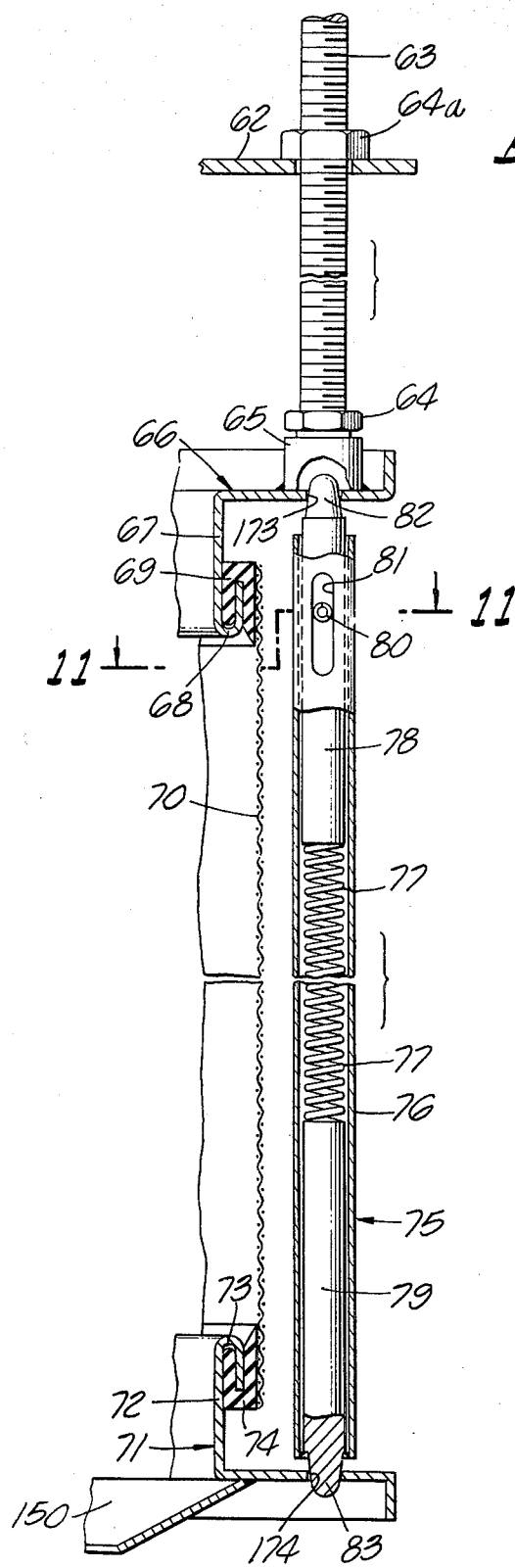
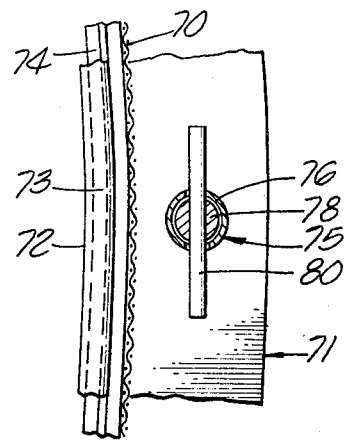
RICHARD K. McKIBBEN
THEODORE R. WESTFALL
CARLTON E. PRESNELL
INVENTORS.
BY
ATTORNEY 3,511,373
DIVERSE SCREENS WITH CLEANING AND
DISTRIBUTION MEANS
Richard K. McKibben, La Canada, Theodore R. Westfall, Glendale, and Carlton E. Presnell, Pasadena, Calif., assignors to Sweco, Inc., a corporation of California
Filed May 22, 1967, Ser. No. 640,239
Int. Cl. B07b 1/08, 1/28, 1/50
U.S. Cl. 209—234                                 9 Claims

ABSTRACT OF THE DISCLOSURE

A screening separator including a first planar vibrating screen positioned in a vibratory housing structure and a pair of concentric rotating cylindrical screens positioned above the planar screen and detached from the vibratory housing structure, and means for feeding a liquid slurry to the innermost of the cylindrical rotating screens, and means for conducting material rejected by the cylindrical screens to the planar screen, and means for separately discharging material passing through the screens and material rejected by the screens, each of the cylindrical screens having inoperative positions and means for cleaning the cylindrical screens through the inoperative positions while the screens are rotating.

---

This invention relates to screening separators and more particularly to an improved separator employing a horizontal vibrating screen which is useful in the separation of relatively small amounts of solids from a large volume of liquids.

Horizontal screen vibratory separating devices such as the type disclosed, for example, in U.S. Pats. 3,035,700; 3,156,643; 3,029,946; 2,777,578; 2,753,999; 2,714,961; 2,696,302; 2,676,706; and 2,284,671, have gained wide acceptance in the separation of solids and in the separation of small quantities of solids from a large quantity of liquid. However, there have been certain applications in which the capacity of such separators has limited their applicability.

For example, when using the conventional vibrating screen separator to remove a relatively small amount of solids from a large volume of liquid, the capacity of the separator is materially retarded by the limited surface area of the horizontal screen because there is a finite rate at which the liquid will pass through the screen, particularly in the presence of the solids, which tend to concentrate on the screen surface. In such instance, the capacity of the separator to remove the relatively small amount of solids is limited by the ability to move the solids across the screen and agglomerate the solids with larger particles so that a maximum open screen area is available to the liquid. Further, when using the vibrating screen separator to remove a relatively small amount of solids from a large volume of liquid, particularly where solids are finely divided or are semi-solids, the screen cloth also has a tendency to become bridged or clogged by the particulate or semi-solid material. This is particularly true in making a preliminary separation between water and finely divided solids in raw sewage where the sewage contains suspended grease often found in domestic household wastes. In these instances, the semi-solid grease tends to bridge and adhere to the screen cloth and gradually reduces the capacity of the cloth to discharge water.

It is therefore, an object of this invention to provide an improved vibratory separator which employs a horizontal screen.

It is another object of this invention to provide an improved vibratory separator, which separator employs a detached circular screen and which is particularly adapted to the separation of large quantities of liquid material from a relatively small quantity of solid material.

It is a still further object of this invention to provide a separator having a novel arrangement which enables the separator to operate at increased capacities by increasing the screen area available with a given diameter unit.

Yet another object of the invention is to provide a separator unit which can be cleaned either while in operation or during short pauses in the operation without the necessity of dismantling the unit or removing the screen therefrom.

A further object of the invention is to provide a vibratory screening apparatus useful in the separation of liquid-solid mixtures.

A still further object of this invention is to provide an improved separator device.

The above and other objects of the present invention are, in part, accomplished by a device which comprises a novel arrangement of screens; by which arrangement more screen surface area is provided, and a process and device for improving a separation in a screening apparatus by operating the device for its intended purpose and preventing screen clogging by applying fluid to an area of the screen cloth in the direction opposite the normal flow of liquid.

The vibratory separator of this invention generally comprises a main housing structure; a second housing structure therein, a first planar screen having an outer periphery secured to the second housing structure, a second screen; means for delivering material to be separated to the second screen adjacent its surface; the second screen being positioned above the first screen such that no portion of the second screen is in a plane parallel to the first screen and such that any of the material which does not flow through the second screen is delivered to the first screen at near the periphery thereof, said second screen detached from said second housing; means for vibrating the second housing structure and the first screen to cause movement of the material on the first screen, and means to cause movement of the second screen. In addition to the basic vibratory separator with the second detached non-planar, non-parallel screen, the present invention in one of its aspects, makes use of a novel arrangement for cleaning the screens either while in operation or intermittently between periods of operation.

In a preferred embodiment of the invention, the second screen is a cylindrical screen positioned so that the axis of the cylinder formed by the screen is perpendicular to the center of the first screen. However, any screen configuration in which the second screen is neither parallel to nor in the same plane as the first screen is within the purview of the invention so long as the discharge (i.e., material not passing through) of the second screen is the feed to the first screen. The cylindrical screen is preferred because it lends itself to inclusion in a cylindrical housing or frame and provides a maximum surface area per unit of height above the planar screen.

In another preferred embodiment of the invention, the second screen is a cylindrical screen positioned above the horizontal screen and there is yet a third screen which is cylindrical and of smaller diameter positioned concentrically within the second screen. In this preferred embodiment of the invention, both the second and third screens rotate and the third screen serves to protect the second screen from damage by large particles of oversize material. Fluid is fed to the cylindrical screen and passes through the third screen from a distributor dome with flow dividers. The material passing through the third screen is distributed on a second flow divider and distributor pan from whence it is impinged on the second screen. Oversize material from both the second and third screen is fed to the first screen. In each of the second and third screens there are units of area through which the fluid does not flow so that the screen can be constantly backwashed while in operation by spray nozzles impinging fluid against the exterior portions of the inoperative section of each screen as will be further described in detail hereinbelow.

In the drawings accompanying this application, FIG. 1 is an overall front view from the exterior of a housing structure which can be used to house the separator of this invention;

FIG. 3 is a plan view looking downward on the top through the line 3—3 of FIG. 2;

FIG. 10 is an enlarged fragmentary cross-section of a screen tensioning arrangement; and FIG. 11 is a section through the line 11—11 of FIG. 10.

Figure 2:
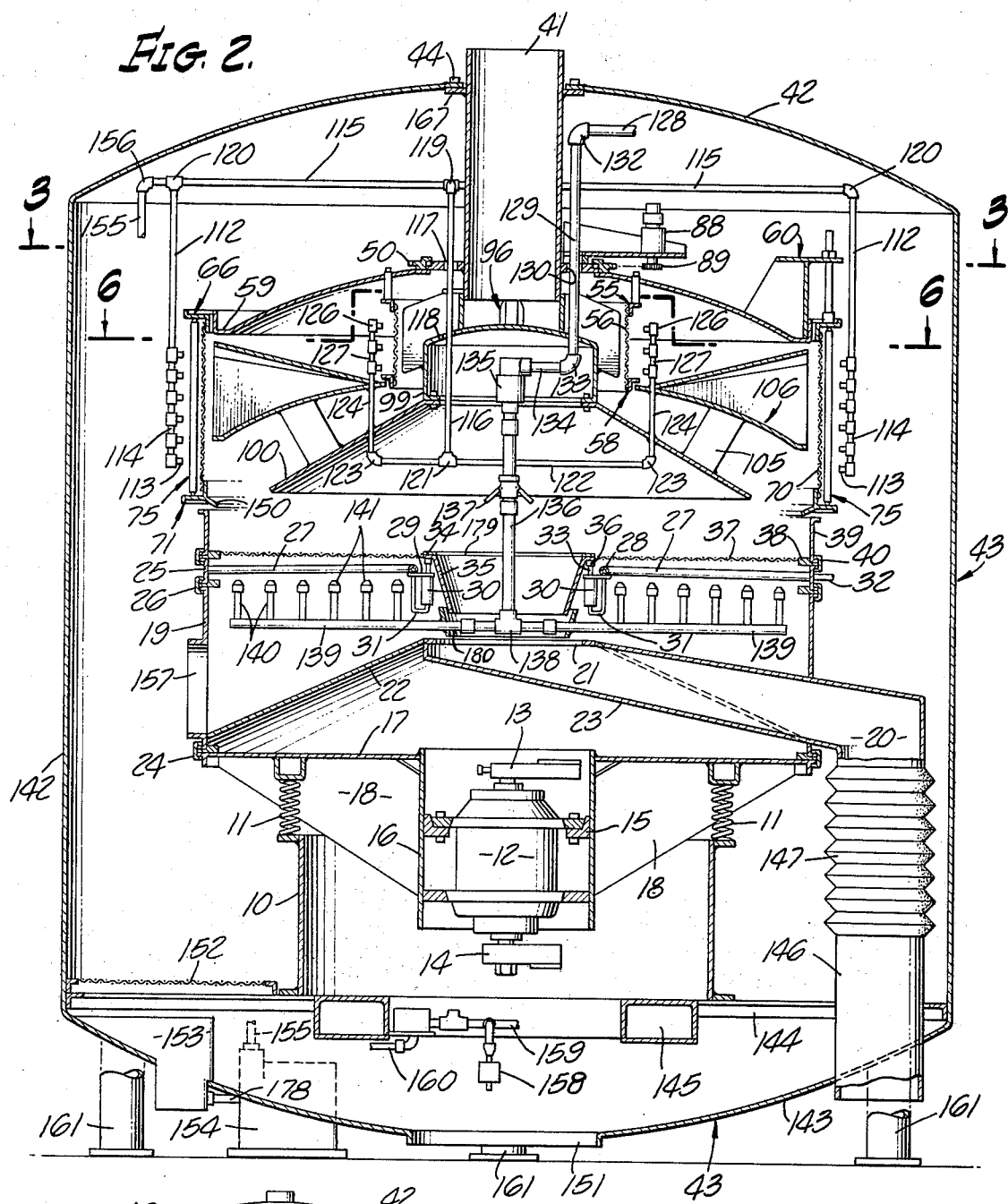
FIG. 2 is a vertical cross-section of the interior of the structure shown in FIG. 1.

Referring now to the drawings, the vibratory shaking or screening device, as shown in FIG. 2, consists of a base frame 10 on the upper portion of which is mounted a ring of springs 11 which supports the vibratory screening device and isolates the vibrations imparted upon such device from the base frame 10.

A vibratory unit comprising a motor 12 and upper and lower eccentric weights 13 and 14 respectively, is mounted by means of the mounting brackets 15 to a cylindrical extension 16 of the upper base 17 which is supported on the ring of springs 11 and is reinforced by gusset plates 18 which project between the springs 11.

The relationship of the vibratory unit and the base frame 10, as described above, may be varied by other arrangements. For example, a motor may be mounted upon the base frame 10. A belt drive from such motor extends to and rotates the eccentric weights which are mounted on the upper base 17.

On the upper base frame 17 is mounted a cylindrical spacing frame 19 having a discharge duct 20 projecting therefrom and communicating with a cylindrical opening 21 in the approximate center through the collector pan 22.

Secured to the interior of the spacing frame 19 is a sloping receiving pan 23 which is inclined and which is isolated from the interior of the discharge duct 20 by the walls of the opening 21. The pan 23 slopes upwardly from the lower portion of the frame 19 and communicates with the walls of the opening 21. At the bottom of the frame 19 is a clamp ring 24 which secures the lower edge of the frame 19 to the upper base 17.

On the cylindrical spacing frame 19 is mounted a cylindrical screen tension spacing frame 25, the lower edge of which is secured to the spacing frame 19 by the clamp ring 26.

Affixed by welding or other suitable means to the interior wall of the frame at spaced intervals about the periphery of the frame 25 are horizontally positioned hollow struts or pipes 27 which radiate inwardly from the periphery of the frame 25 toward the center. The inwardly radiating hollow struts 27 communicate with the hollow support ring or circular pipe 28 and are affixed thereto by welding, threaded coupling or other suitable means. Brackets 29 are affixed by welding or other suitable means to the ring 28 at spaced intervals about the ring 28. Vertically positioned air cylinders 30 are affixed by bolting, welding or other suitable means to the provided brackets 29 which support the air cylinders 30. Affixed to the lower portion of each air cylinder 30 in a U-shaped air line 31, which communicates with the hallow ring 28. The radiating struts 27 and circular ring 28 function as a support and also as a means to pass air to the air cylinders 30. Air line fitting 32 in the cylindrical frame 25 communicates with one of the hollow struts 27. Therefore, the piston 33 of the air cylinder 30 may be actuated by passing air from the fitting 32 into the hollow struts 27, the air then passing into the circular ring 28 and being distributed into the air lines 31 spaced at intervals around the ring 28 and which communicate with the air cylinder 30.

Although the strut 27 and ring 28 as above described are employed to function as air lines to the respective air cylinders 30, it should be observed that as an alternative arrangement an internal air line (not shown) may pass through one or more of the struts 27 and ring 28, ultimately communicating with each air cylinder 30 by an air line similar to 31.

Because only a single air line 31 is affixed to the lower portion of the air cylinder 30 as shown in FIG. 2 the cylinder 30 is capable of actuating the piston 33 only upward relying on gravity for any return or downward movement of the piston 33. It should, however, be observed that a double actuating cylinder may be employed where, by virtue of an air line at the lower and upper portion of the cylinder, the piston may be actuated upward or downward in a manner which is commonly known in the art. Further, the cylinder 30 need not necessarily be air actuated, but may also be liquid actuated.

Affixed by welding or other suitable means to the underside of the peripheral flange 34 of the conical funnel 35 is a toggle pad 36. The toggle pad 36 is attached to the piston 33 and thus the funnel 35 is swivelly mounted at spaced intervals about the periphery of the flange 34 to the pistons 33 which project from their respective air cylinders 30.

As shown in FIG. 2, the inner periphery and outer periphery of the horizontal screen 37 are secured to inner and outer tension rings 179 and 38 respectively, thus forming a rigid single unit. The inner periphery of the screen 37 is affixed to the inner tension ring 179 by spot welding, bonding or other suitable means. The outer periphery of the horizontal screen 37 rests upon the outer marginal tension ring 38 and is bonded, spot welded or otherwise affixed thereto. Upon affixing the peripheries of the screen 37 to the tension rings 179 and 38, the screen 37 and tension rings form a single rigid and removable unit. The screen assembly is placed onto the vibratory separator unit so that the inner tension ring merely rests upon the outwardly projecting peripheral flange 34 of the conical funnel 35 which, as previously described, is swivelly mounted upon the pistons 33 by virtue of the toggle pads 36.

A circular ring 45 of rubber, polyurethane or other suitable material which is affixed in a suitable manner to the upperside of the peripheral flange 34 reduces the abrasive action between the tension ring 179 and flange 34 which would exist during the vibratory operation of the separator unit.

A lip projects outwardly from the outer margin of the tension ring 38, the lip being interposed between the spacing frames 25 and 39 and resting upon the flange which projects outwardly from the upper periphery of the spacing frame 25. A clamp ring 40 secures the spacing frames 25 and 39 and the interposed flange of the tension ring 38.

The fluid flowing in the lines to accomplish the cleaning need not be steam but may be any suitable solvent which will melt or dissolve the material which causes the screen clogging or bridging. Thus, under certain circumstances, hot water may be employed to effect the desired steam cleaning.

The steam cleaning apparatus is pre-assembled into the device, but is mechanically separated therefrom so that no vibration is imparted to the steam cleaning apparatus.

Prior to operation of the vibratory separator and by virtue of the screen tension arrangement as previously described, the pistons 33 of the air cylinders 30 are vertically actuated to a predetermined height so as to raise the funnel 35 and overlying inner screen tension ring 179 to a height which sufficiently tensions the shaking screen 37 to prevent "screen flopping" during operation of the vibratory separator.

The separator as thus far described functions to separate materials of two different sizes (or liquid from solid) through the screen 37, by virtue of the vibratory motion imparted by the vibratory unit, including upper and lower eccentric weights 13 and 14 and the feed arrangement by which the material to be separated is fed onto the outer periphery of the screen 37. As the material to be separated is fed onto the screen 37, the imparted vibratory motion causes the material to move along the screen, the oversize portion of the material being discharged through the discharge opening 21.

The undersize material which passes through the screen 37 falls onto the receiving pan 22 and, by falling along the receiving pan 22 and around the inside of the frame 19, is ultimately discharged through the discharge duct 157.

To remove the screen 37, the clamp ring 40 is loosened from its clamping position and the spacing frame 39 is removed from the separator unit. The screen 37 may then be easily lifted from the separator.

Figure 4:
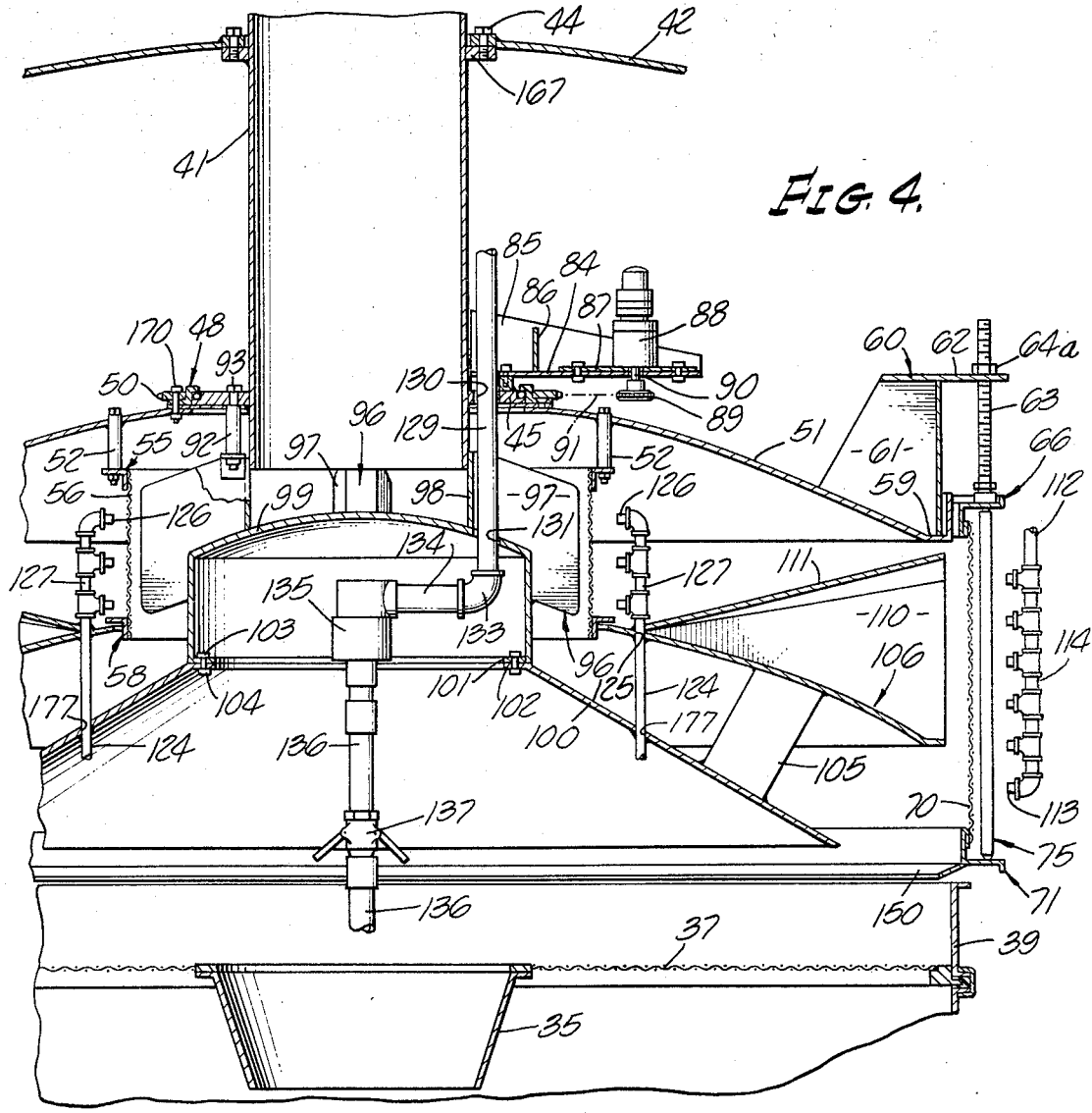
FIG. 4 is an enlarged fragmentary cross-section of the upper portion of FIG. 2.
Figure 5:
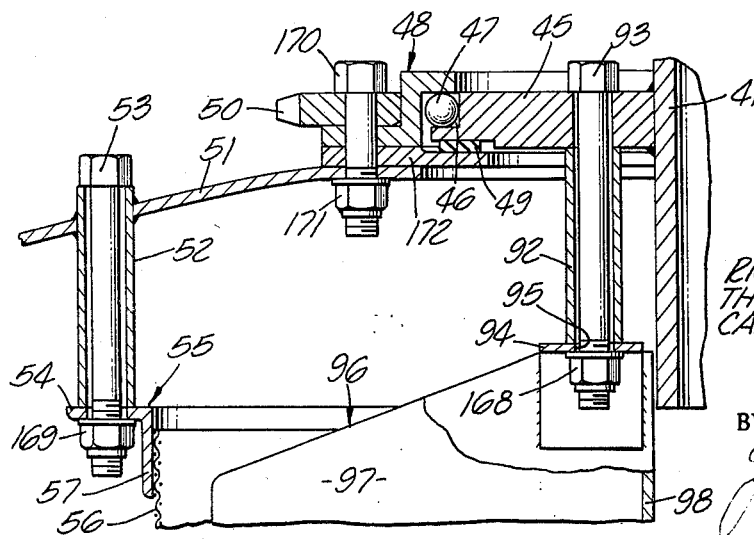
FIG. 5 is an enlarged fragmentary cross-section of a portion of FIG. 4 showing the screen rotating mechanism in detail.

A vertical inlet pipe 41 passes through the central opening in the dome-shaped top 42 of the cylindrical shell 43. The peripheral flange 167, welded or otherwise affixed about the wall of the pipe 41, is secured to the dome-shaped top 42 by bolts 44 which pass through the peripheral edge of the opening in the top 42 and the flange 167. As best shown in FIGS. 4 and 5, disposed near the lower periphery of the pipe 41 on a plane perpendicular to the vertical pipe is the circular bearing support 45 which is welded or otherwise suitably affixed about the wall of the pipe 41. The outer peripheral edge of the circular bearing support 45 is provided with a bevel 46 upon which rest a plurality of spherical bearings 47. The circular L-shaped flange 48 comprising an upper and lower horizontal member interconnected by the vertical flange, abuts the periphery of the support 45 so as to enclose the ball bearing within the confines of the bevel 46 and the upper horizontal and vertical portion of the L-shaped flange 48. The lower horizontal member of the flange 48 rests upon the circular lower bearing support 172. An annular bearing of polyurethane or other suitable material is interposed between the lower peripheral edge of the bearing support 45 and the lower bearing support 172. The lower bearing support 172 rests upon the inner periphery of a support dome 51. Positioned on the lower horizontal member of the L-shaped flange 48 is an annular screen rotating sprocket 50. The sprocket 50, horizontal member of the flange 48, lower bearing support 172 and inner periphery of the support dome are rigidly secured together by virtue of a bolt 170 passing through such members, the end of the bolt being provided with an internally threaded nut 171.

By virtue of the vertical and horizontal members of the flange 48 resting against the plurality of bearings in the bevel 46 and the inner projecting portion of the lower bearing support resting against lower annular bearing 49, the sprocket 50, L-shaped flange 48, lower support 172 and support dome 51 may rotate about the stationary bearing support 45 and inlet pipe 41.

As best shown in FIGS. 3, 4 and 5, hollow sleeves 52, located at intervals about the dome 51, vertically project through the rotating screen support dome, the upper portion of such sleeve being welded or otherwise suitably secured to the dome 51. A bolt 53 passes through the sleeve 52 and the horizontal portion 54 of a screen mount ring 55, such ring resting against the lower peripheral edge of the sleeve 52. Upon tightening the internally threaded nut 169 upon the end of the bolt 53, the horizontal portion 54 of the mounting ring 55 is secured aginst the lower peripheral edge of the sleeve. The upper periphery of the cylindrical screen 56 is welded, bonded or otherwise suitably affixed to the vertical portion 57 of the ring 55. The lower periphery of the screen 56 is bonded, welded or otherwise suitably secured to the vertical portion of a lower mounting ring 58.

As shown in FIGS. 3 and 4, positioned at intervals about the peripheral edge 59 of the rotating dome 51 and vertically projecting upward therefrom, is a T-shaped flange 60.

In FIGS. 4 and 10, the externally threaded bolt 63 projects downwardly through the provided opening in the outwardly projecting horizontal portion 62 of the flange 60. The upper end of the bolt 63 projecting above the outer portion 62 of the flange 60 is fitted with an internally threaded nut 64.

As best shown in FIG. 10, the internally threaded nut 64 is attached to the lowermost end of the bolt 63, such nut, in turn, being welded or otherwise suitably secured to the horizontal flange of the upper circular screen support ring 66. The lower periphery of the vertical portion 67 of the ring 66 is provided with a U-bend portion 68. The upper periphery of the fine screen 70 is welded, bonded or otherwise suitably secured to the outer vertical side of the U-shaped mounting ring 69. Although the mounting ring 69 may be constructed from metal, it is preferable that the mounting ring 69 be made of a resilient material such as polyurethane.

The U-shaped mounting ring 69 is interconnected with the U-shaped portion 68 of the support ring 66. The lower periphery of the screen 70 is bonded, welded or otherwise suitably secured to the lower mounting ring 74. The lower U-shaped mounting ring 74 is interconnected with the U-shaped portion 73 of the vertical flange 72 of the lower support ring 71. Extending between the horizontal flange of the upper support ring 66 and the horizontal flange of the lower support ring 71 is the spring-loaded tensioning rod 75. The spring-loaded tensioning rod comprises the elongated hollow cylindrical shell 76 within the lower portion of which is welded the rod 79. A nipple 82 projects downward from the lowermost portion of the rod 79.

Positioned within the upper portion of the shell 76 is the slidable rod 78. The spring 77 extends between the upper end of the stationary rod 79 and the lower end of the slidable rod 78. The horizontal rod 80 passes through the slidable rod 78 with the projecting ends of the rod 80 extending through vertical channels 81 provided on opposite sides of the shell 76. A nipple 82 projects from the uppermost end of the slidable rod 78. The tensioning rod device 76 is inserted in its extending position between the upper and lower support ring 66 and 71 whereby the nipple projecting from the stationary rod 79 is inserted in an opening 174 provided in the lower support ring.

The projecting nipple 82 of the slidable rod 78 is inserted into the provided opening in upper support ring 66.

In order to assemble and disassemble the rotating cylindrical screen assembly, including the outer rotating screen 70 and the inner rotating screen 56, the outer screen 70 and supporting rings 66 and 71 may be raised manually and the nut 64a rotated downwardly on the bolt 63. This provides access to the feed pipe 136 and quick disconnect; coupling 137.

As best shown in FIGS. 10 and 11, the cylindrical screen 70 is assembled and removed from the unit by virture of the spring loaded tensioning rod 75. The screen 70 has upper and lower mount rings 69 and 74 of a U-shaped resilient channel material which fit over the inverted U-shaped portions 68 and 73. When the tension rods 75 are removed, the channel members, with the screen attached, are placed over the U-shaped members 68 and 73 and the tension rods are placed into the holes provided therefor by depressing the spring handle 80. The lower support ring 71 is otherwise detached completely from the remainder of the device.

As best shown in FIG. 4, the rectangular motor support plate 84 is bolted, welded or otherwise secured to the periphery of the upper portion of the circular bearing support and such plate extending radially therefrom and being disposed over the rotating screen support dome 51. Welded, bolted or otherwise affixed to the upper portion of the support plate 84 is the upper motor support plate 87 which further reinforces the lower support plate 84. Gusset plates 85 and 86, welded or otherwise suitably secured to the bearing support 45 and motor support plate 84, provides additional stability to the plate 84.

The vertically positioned motor 88 is bolted or otherwise affixed to the upper and lower support plates 84 and 87. The rotating shaft 90 of the motor 88 extends vertically downward through provided openings in the support plates 87 and 84. The screen drive socket 89 is suitably secured to the lowermost end of the shaft 90 in such a manner as to dispose the screen drive sprocket 89 at the same plane as the screen rotating sprocket 50 (FIG. 5).

It should be observed that the motor 88 may be air or electrically actuated.

The screen drive sprocket 89 is associated with and rotates the screen rotating sprocket through the drive chain 91. As an alternative, the motor may rotate the screen drive sprocket through a belt-drive arrangement instead of the chain 91 connecting the screen rotating sprocket 50 (FIG. 5) with the drive sprocket 89.

As best shown in FIG. 4, an elongated bolt 93 passes through the openings in the bearing support 45 provided at spaced intervals about the inner periphery of the support 45. A hollow spacing sleeve 92 fits over the downward extending portion of the bolt 93. The lowermost portion of the bolt 93 which extends beyond the lowermost end of the sleeve 92, passes through opening 95 provided on the horizontal flange 94 (FIG. 8) the end of such bolt being provided with an internally threaded nut which, upon tightening, secures the flange 94 against the sleeve 92.

The flange 94 is welded or otherwise secured to the walls 97 of the flow dividers 96 which are positioned at spaced intervals about and welded or otherwise secured to the inner distributing pan 99. The inner distributor pan is cylindrical with a dome-shaped top. The lower edges of the walls 97 of the flow dividers 96 and the end 98 of the flow dividers, are contoured to the slope of the pan 99. The flow divider 96 is positioned upon the pan 99 such that the walls 97 of the flow divider 96 are aligned with an imaginary line from the center of the pan 99.

In FIG. 4, a horizontal flange 101 inwardly projects from the lower peripheral edge of the inner distributing pan 99. The upper peripheral flange 102 of the conical solids deflector pan 100 is secured to the peripheral flange 101 of the pan 96 by bolts 103 which pass through the provided openings about the flange 101 and 102 with the end of such bolts secured to an internally threaded nut 104. The lower peripheral edge of the deflector pan is disposed above the vibrating screen 37 near the outer periphery thereof.

In FIG. 4, gusset plates 105, welded or otherwise affixed to the conical deflector 100 at spaced intervals, upwardly project from the conical deflector 100. The gusset plates 105 are welded or otherwise affixed to and support the outer distributing dome 106.

Figure 7:
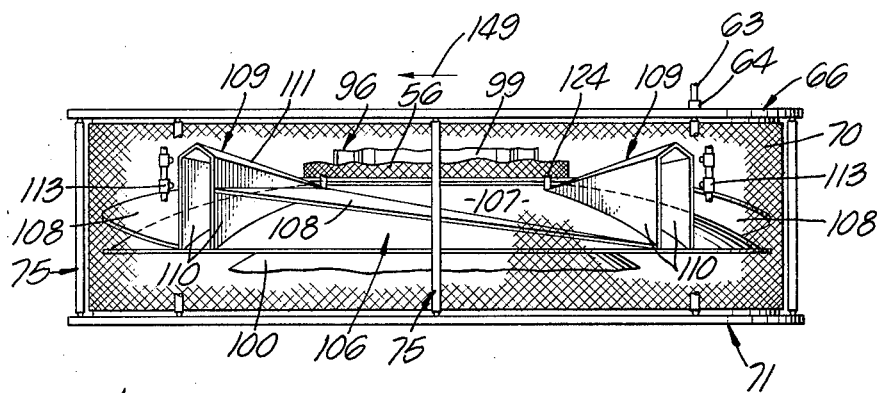
FIG. 7 is a partial perspective of the cylindrical rotating screen, distributor plan and flow divider in partial cutaway.
Figure 8:
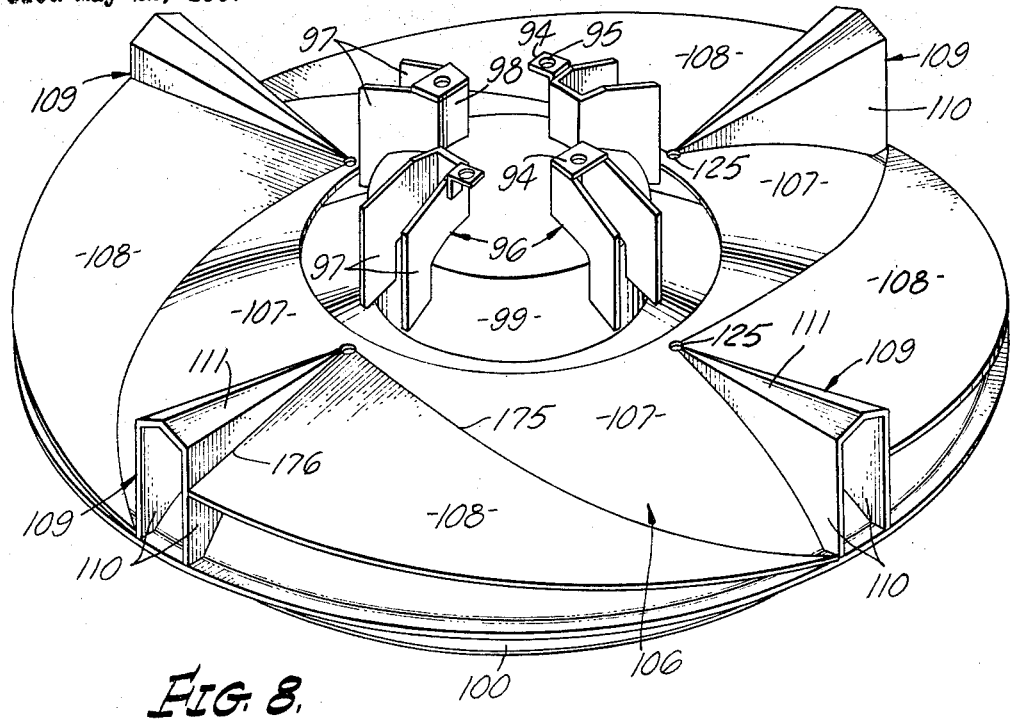
FIG. 8 is an enlarged perspective of the flow divider and fluid distribution means employed in the invention.

In FIGS. 7 and 8, the flow dividers 109 are disposed at spaced intervals about the dome 106. The flow divider consists of side walls 110 which converge as they approach the inner periphery of the dome 106. The lower edge of the walls 110 conform to the shape of the dome and are welded thereto. An apexed top member 111 is secured to or formed as a fabricated extension of the upper edge of the walls 97.

The flow dividers 109, disposed on the outer distributing dome 106, are radially aligned with the flow dividers 96 disposed on the inner distributing dome 99.

As shown in FIGS. 7 and 8, a helical surface 108 ascends from a point at the outer periphery of the dome 106 and adjacent the wall of the flow divider 109 to approximately half the height of the wall 97 of the next adjacent flow divider 109.

The inner edge 175 of the helical surface 108 is welded, bonded or otherwise secured to the domed surface 107. The edge 176 of the helical surface 108 is welded or otherwise affixed to the wall 110 of the flow dividers 109.

Figure 6:
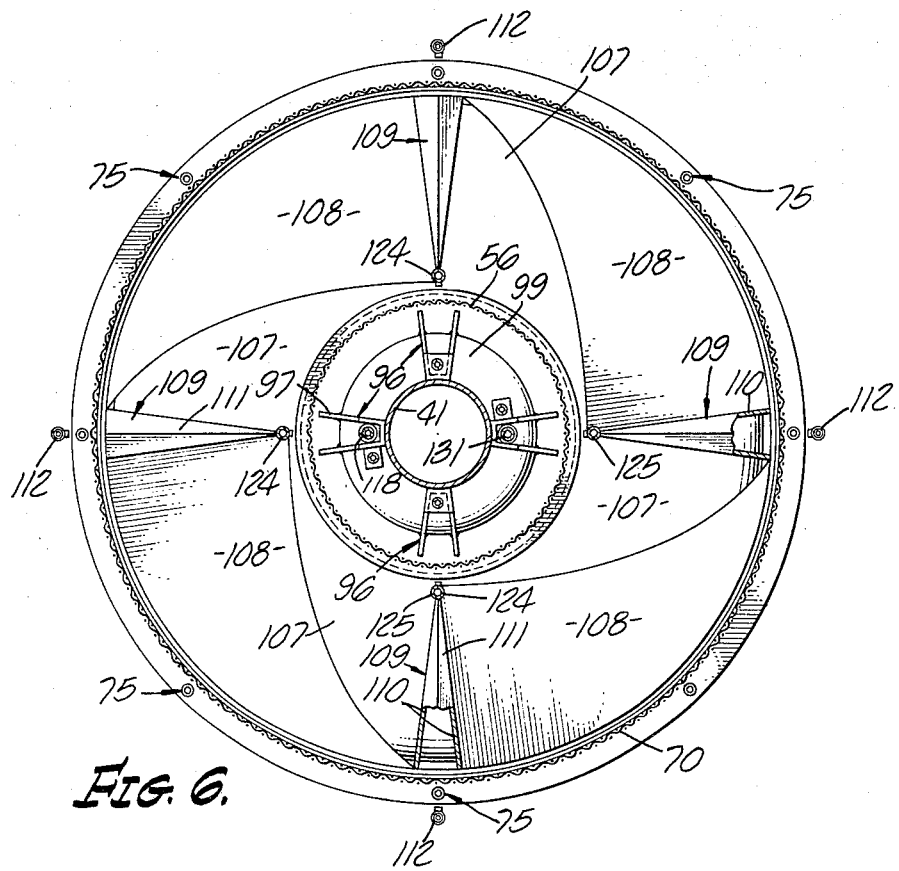
FIG. 6 is a cross-section taken through the line 6—6 of FIG. 2.

As shown in FIG. 2, a vertical pipe 112 downwardly extends from the coupling 120. The pipe 112 is parallel to and adjacent the outer surface of the screen 70. The lower portion of pipe 112 adjacent the vertical height of the screen 75 is provided with a series of interconnected studs and spray nozzles. The horizontal pipes 115 extend from the coupling 120 to the coupling 119. The pipe 116 downwardly extends through the provided opening 117, FIGS. 2 and 3, in the bearing support 45 and the opening 118 (FIGS. 2 and 6) in the inner dome-shaped distributor pan 99. The lower end of the pipe 116 communicates with the horizontal pipe 122 through the coupling 121.

The horizontal pipes 122 communicate with the vertical pipes 124 through the coupling 123. The upwardly extending vertical pipes 124 pass through and are welded to the provided openings 177 (FIG. 4) spaced at intervals about the periphery of the deflector cone 100 and further extend upwardly through the provided openings 125 (FIGS. 4, 6, and 8) in the outer distributor dome 106, the upper portion of the pipes 124 being disposed parallel to and adjacent the outer surface of the inner screen 56. The upper portion of the pipes 124, which are parallel to and adjacent the screen 56, are interconnected with studs 127 and spray nozzles 126 which direct the spray upon the surface of the screen 56.

The inner and outer screen cleaning arrangement, as above described, is a stationary unit.

A spray arrangement may also be employed to clean the horizontal screen 37.

In FIG. 2, the horizontal entry line 128 communicates with the vertical pipe 129 through the coupling 132. The vertical pipe 129, disposed parallel to and adjacent the inlet pipe 41, downwardly extends through the provided opening 130 in the motor plate 84, the opening 117 in the bearing support 45, and the opening 131 in the dome-shaped member of the inner distributing dome 99.

Figure 1:
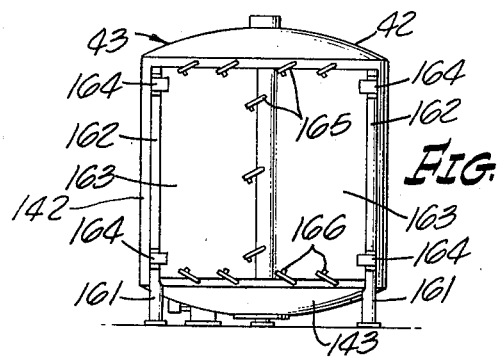

The vertical pipe 129 communicates with the horizontal pipe 134 through the coupling 133. The vertical pipe 136 is supported by and communicates with the horizontal pipe 134 by virtue of a rotable coupling 135 which permits the vertical pipe 136 to rotate. As shown in FIG. 1, the vertical pipe 136 downwardly extends through the central discharge opening of the horizontal screen. The vertical pipe 136 communicates with radiating arms 139 through the T-shaped coupling 138. Legs 140 vertically extend upward from the upper portion of the arms 139, at spaced intervals along the arms 139. The upper end of each leg 140 is provided with the spray nozzle 141 which directs the fluid upon the undersurface of the screen 37. The nozzles 141 may be canted to enable the cleaning arrangement including the pipe 136, arms 139 and legs 140 to rotate in the coupling 135 by virtue of the reaction pressure of the fluid being emitted from the canted nozzles 141.

The apparatus as above described functions to separate solids of different sizes and separate solids from liquids.

Figure 9:
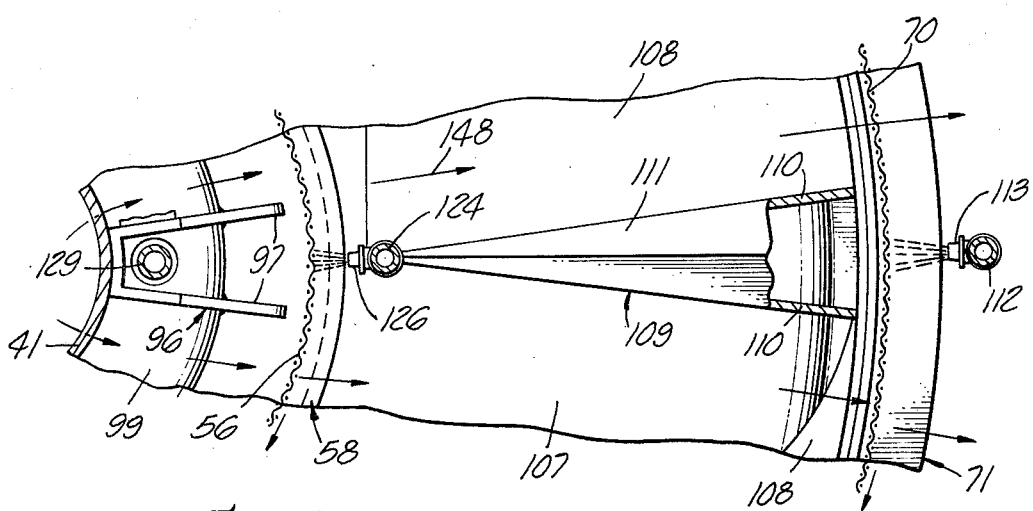
FIG. 9 is an enlarged plan view in fragment of a portion of the flow divider arrangement.

Material to be separated, such as for example, the suspended solids of sewage effluent, enters through the vertical inlet pipe 41. The effluent direction flow is changed from vertical to horizontal by the inner distributing dome 99 which is disposed beneath the inlet pipe 41. The velocity of effluent flowing from the inlet pipe 41 onto the dome 99 may be controlled by varying the distance between the lower periphery of the inlet pipe and the dome 99. This could be accomplished, for example, by placing a slidable inner inlet pipe (not shown) within the inlet pipe 41. As best shown in FIGS. 1 and 9, the distributing pipe 99 directs the effluent against the inner coarse mesh screen 56 as indicated by the arrow 148 (FIG. 9).

As previously described, the inner coarse screen 56 and outer fine mesh screen 70 revolve together at any desired rotational speed. To prevent the screen 56 from becoming clogged by the effluent being directed against the screen, the stationary spray nozzles emit fluid upon the surface of the screen 56. The flow divides 96 prevent the distributed effluent from being distributed against the vertical portion of the screen 56 that is being backsprayed by the spray nozzles 116. Therefore, as the screen 56 revolves, the entire surface of the screen 56 ultimately is cleaned upon revolving past the vertically aligned spray nozzles 126.

The coarse material which does not pass through the inner revolving screen 56, falls onto the coarse solids deflector 100, which is disposed below the inner screen 56. The coarse material then travels down the slope of the conical deflector to become distributed from the periphery of the deflector 100 onto the periphery of the vibratory screen 37.

As best shown in FIG. 7, the effluent which passes through the coarse mesh screen 56 is distributed into the outer distributing dome 106 which directs the effluent against the revolving fine mesh screen 70.

By virtue of the helical surface 108 of the dome 106, the effluent is directed as a diagonal flow of effluent against the screen 70. By directing the effluent against substantially the entire vertical height of the screen 70, the screen wear is materially reduced. As the screen 70 revolves about the helical surfaces 108 of the dome 106, substantially the entire vertical height of the screen 70 is subjected to the effluent flow resulting in an even wear rate over the entire screen 70. Further, by directing the effluent against a greater amount of screen area, the capacity of the separator is materially increased.

It should be observed that the incline of the helical surface is preferably in the direction of the rotation of the screen 70.

It should further be recognized that any surface arrangement of the dome 106 may be employed which would direct the effluent against substantially the entire vertical height of the screen surface.

The oversize material which does not pass through the fine mesh screen 70, falls onto the outer periphery of the vibrating screen 37 of the vibratory screen apparatus. It should be observed that a flange 150 inwardly projecting from the bottom periphery of the lower screen support ring 71 prevents the oversize material from passing through the space between the upper periphery of the spacing frame 39 and the lower screen support ring 71 (FIG. 10).

As previously described, the material which does not pass through the coarse mesh screen 56 or the fine mesh screen 70 becomes distributed onto outer periphery of the vibrating screen 37.

The vibratory separator functions to separate materials of two different sizes (or liquid from solid) through the screen 37, by virtue of the vibratory motion imparted by the vibratory unit, including upper and lower eccentric weights 13 and 14. The vibratory motion causes the material to move along the screen 37; the oversize portion of the material falling into the discharge opening 21, traveling down the sloping pan 23 and becoming discharged from the discharge duct 20.

In order to prevent oversize material which is passing through the conical member 35 into the oversize discharge duct 20 from splashing out onto the oversize collector pan 22, the rotating arms 139 may be provided with a splash guard 180. This splash guard 180 has slightly larger diameter than the lowermost portion of the conical member 35 but continues the same general conical shape to direct material through the hole 21.

Undersize material passing through the screen 37 falls onto the dome-shaped receiving pan 22 and becomes discharged through the discharge duct 157.

As above described, the oversize material not passing through the inner and outer screen 56 and 70, falls onto the periphery of vibratory screen which employs a central discharge opening.

By an alternative arrangement, the oversize material not passing through the inner and outer screen 56 and 70 may decome distributed onto the central area of a peripheral discharge vibratory separator. The periphery of a dish-shaped receiving pan (not shown) may be secured to the lower screen support ring 70 (FIG. 10). Oversize material not passing through the inner and outer rotating screen 56 and 70 would fall onto the dish-shaped pan (not shown) and become discharged through the opening at the center of the pan onto the central area of the vibratory screen. The oversize material upon the screen ultimately becomes discharged from a peripheral discharge duct. The undersize material passing through the screen falls onto a dome-shaped receiving pan (not shown) disposed below the screen and becomes discharged by a discharge duct (not shown) communicating with such pan.

As shown in FIG. 2, the entire separating arrangement is contained within an enclosure 43 consisting of cylindrical side walls 142, the dome-shaped top 42, and the dish-shaped bottom 143. The lower peripheral flange of the base frame 10 of the vibratory separator is bolted or otherwise secured to support struts 144 which extend between and are affixed to the lower periphery of the cylindrical wall 142.

Undersize material which passes through the fine mesh screen 70, falls into the dish-shaped shell bottom 43 and is ultimately discharged through the undersize discharge duct 151. Undersize material passing through the horizontal screen 37 of the vibratory separator which is discharged from the discharge duct 157 may either fall to the shell bottom 43 or be separately removed from the shell by a flexible sleeve (not shown) affixed to the discharge duct 157 and communicating with a discharge pipe (not shown) affixed to the shell 43.

The sump 153 receives a portion of the undersize material passing through the outer screen 70. A removable screen or grating 152, affixed to the struts 144, permits easy access to the sump for cleaning purposes. The sump 153 communicates with the pump 154 through the pipe 178. The vertical pipe 155, extending upward from the pump 154, communicates the pump 154 with the lines of the cleaning arrangement for the rotating screens 56 and 70 by virtue of the pipe 155 communicating with the coupling 156, which in turn communicates with the coupling 120.

The sump 153 and pump 154 function to circulate a portion of the liquid passing through the rotating screen 70 to the cleaning arrangement for the vertical rotating screens 56 and 70.

It should be observed, however, that as an alternative, a fluid inlet line (not shown) may enter the shell 43 and communicate with the lines of the cleaning arrangement to provide clean liquid, steam or hot fluid to the cleaning arrangement. In such a case, the sump 153 and pump 154 need not be in operation.

Although the screen cleaning arrangement has been described as using recirculated effluent or some extraneous fluid, the nozzles 126 for the screen 56, the nozzles 113 for the screen 70 and the nozzles 141 for the screen 37 may all be fed from a common fluid source. Alternatively, these screen cleaning systems may each be individually fed with a separate source of fresh liquid, recirculated effluent or a hot vapor such as steam. The entire steam cleaning system is preferably isolated from the effect of the vibratory eccentric weight motor which causes the screen 37 to vibrate during operation.

When the level of discharged material in the shell bottom 143 reaches a level pre-set by raising or lowering the actuating float 158, the level is maintained by the float 158 actuating a switch (not shown) which by virtue of the cable 160 connected to the main electrical control panel (not shown) shuts off or reduces the flow of effluent material into the inlet pipe 41.

By virtue of the cable 159 connected to the motor leads (not shown), the motor 12 of the vibratory separator may also be shut off or reduced in speed by the switch (not shown).

The oversize material which discharges from the discharge duct 20 of the vibratory separator is ultimately discharged by way of the stationary discharge pipe 146 which projects from the shell bottom 143. The discharge duct 20 communicates with the stationary discharge pipe 146 through the flexible coupling 147 which isolates the vibrations imparted to the vibratory separator including the duct 20 from the stationary duct 146.

As shown in FIGS. 1 and 3, the shell 43 which encloses the separating device of this invention is provided with elongated cylindrical legs 161 which vertically project from the shell bottom. The legs 161 are welded to or fabricated as an extension of the elongated cylindrical leg supports 162. The leg supports vertically extend to a point near the upper periphery of the cylindrical shell 142 and are welded or otherwise secured thereto. Two doors 163 conforming to the contour of the cylindrical shell 142 are secured to the shell 142 by hinges 164 at the upper and lower portion of the door. The hinges 164 are secured in a suitable manner to the elongated cylindrical leg supports 162.

Rotating door handles 165 spaced at intervals about the peripheral edge of the opening in cylindrical shell 142 secure the doors 163 when in their closed position. Such handles and securing means are commonly known in the art.

The doors 163 in their open position provide an opening in the shell 142 of sufficient size to enable access to the entire separating unit for repair or removal therefrom.

Fork lift channels 145, welded or otherwise suitable secured to the bare frame of the vibratory separator, enable a fork lift to remove the vibratory separator from the shell enclosure 43.

It is to be emphasized that the rotating screens 70 and 56 and all their associated mechanisms, including the distributing pans, flow dividers and feed pipes, are isolated from the vibrating cylindrical housing which is generally comprised of the spacing frames 19, 25, and 39, the base 17 and vibrating eccentric motor 12.

We claim:
1. A screening apparatus comprising
a substantially cylindrical screen having a substantially vertical axis,
means coupled with said screen for supporting and rotating said screen,
distribution means positioned adjacent said screen for feeding material to be separated along the inner surface of said screen, said distribution means including a plurality of baffle members thereon for blocking a portion of the feed of said material toward the inner surface of said screen, and
cleaning means for spraying a fluid through said screen from the outer to the inner surface, said cleaning means including a plurality of fluid flow directing members positioned adjacent the outer surface of said screen and maintained substantially aligned with said baffle member of said distribution means for enabling the spray of fluid to impinge upon portions of said screen from which the feed of material is blocked by said baffle members.

2. A screening apparatus as in claim 1 including
a second substantially cylindrical screen having a substantially vertical axis,
said means coupled with said first screen being coupled with said second screen for supporting and rotating said second screen,
said distribution means having a second plurality of baffle members, and
said cleaning means including a second plurality of flow directing members positioned adjacent the outer surface of said second screen and maintained substantially aligned respectively with said second plurality of baffle members.

3. A screening apparatus having means for back washing a screen member thereof comprising
a first substantially cylindrical screen having a substantially vertical axis,
a second substantially cylindrical screen of smaller diameter than said first screen mounted coaxially with respect to said first screen,
means coupled with said first and second screens for rotating said screens,
distribution dome means having first and second portions respectively adjacent said first and second means for feeding material to be separated toward the inner sides of said screen, each of said portions of said distribution dome means including baffle areas for preventing a portion of the flow of said material from being directed toward the inner side of said first and second screens, and
cleaning means for spraying a fluid through each of said screens from the outer to the inner sides thereof, said cleaning means including first and second spray members, the first of said spray members being mounted adjacent the outer side of said first screen and maintained substantially aligned with the baffle areas of said first portion of said distribution means, and said second spray members being mounted adjacent the outer side of said second screen and substantially aligned with the baffle areas of said second portion of said distribution means for enabling spray of fluid to impinge upon the portions of said respective screens baffled by said respective baffle areas.

4. An apparatus as in claim 3 including
a third substantially planar screen mounted below said first and second screens, and vibration means coupled with said third screen for vibrating said third screen, and
said cleaning means being isolated from said vibration means.

5. A screening apparatus comprising
a substantially cylindrical screen having a substantially vertical axis, means coupled with said screen for supporting and rotating said screen, distribution means positioned adjacent said screen for feeding material to be separated along the inner surface of said screen, said distribution means including a plurality of baffle members thereon for blocking a portion of the feed of said material toward the inner surface of said screen, cleaning means for spraying a fluid through said screen from the outer to the inner surface, said cleaning means including a plurality of fluid flow directing members positioned adjacent the outer surface of said screen and maintained substantially aligned with said baffle members of said distribution means for enabling the spray of fluid to impinge upon said screen at the areas thereof blocked by said baffle members, a substantially planar screen mounted below said cylindrical screen such that material to be screened which does not flow through said cylindrical screen is delivered to said planar screen, and vibratory means coupled to vibrate said planar screen, said cleaning means being isolated from vibrations of said vibratory means.

6. A screening apparatus for screening and separating material comprising a substantially cylindrical screen having a substantially vertical axis, means coupled with said screen for supporting said screen for rotation about said axis, distribution dome means positioned adjacent said screen for feeding material to be separated along the inner surface of said screen, said distribution dome means having a plurality of segments each of which includes a flow divider and a material feed surface, each feed surface serving to feed said material to the inner surface of said screen and each said flow divider serving to baffle a portion of the feed of said material to areas of the inner surface of said screen, and cleaning means for spraying a fluid through said screen from the outer to the inner surface thereof at said baffled areas thereof, said cleaning means including a plurality of fluid flow directing members positioned adjacent the outer surface of said screen and maintained substantially aligned with said flow dividers.

7. A screening apparatus as in claim 6 including
a second substantially cylindrical screen of smaller diameter than said first named screen mounted coaxially with respect to said first screen, said distribution dome means including a second plurality of flow dividers positioned adjacent the inner surface of said second screen, and said cleaning means including a plurality of flow directing members positioned adjacent the outer surface of said second screen and substantially aligned respectively with said second plurality of flow dividers.

8. A screening apparatus as in claim 7 including
a third substantially planar screen mounted below said cylindrical screens for receiving material which does not flow through said cylindrical screens, and vibratory means coupled to vibrate said third screen.

9. A screening apparatus as in claim 6 wherein said material is a liquid-solids material, said apparatus including pump means for receiving liquid separate from said liquid-solids material, said pump means being coupled with said cleaning means for supplying fluid thereto.

References Cited

UNITED STATES PATENTS

| | | | |
|---|---|---|---|
| 811,930 | 2/1906 | Kihlgren | 209—300 X |
| 1,134,304 | 4/1915 | Westbye | 209—306 X |
| 1,225,198 | 5/1917 | Westby | 209—300 X |
| 1,450,145 | 3/1923 | Ellenwood | 209—311 |
| 2,975,899 | 3/1961 | Cannon | 209—273 |
| 315,308 | 4/1885 | Martin | 209—304 |
| 735,444 | 8/1903 | Baker | 209—303 X |
| 2,751,079 | 6/1956 | Aulmann | 209—380 X |
| 3,221,886 | 12/1965 | La Mort | 209—380 X |

FOREIGN PATENTS

| | | |
|---|---|---|
| 298,602 | 5/1954 | Switzerland. |
| 21,562 | 1/1910 | Norway. |

HARRY B. THORNTON, Primary Examiner

R. HALPER, Assistant Examiner

U.S. Cl. X.R.

209—254, 305, 380